May 28, 1968 L. D. THOMAS 3,386,052

WIDE BAND DISTRIBUTED PHASE MODULATOR

Filed Nov. 5, 1964

WITNESSES

Edmund E. Bassler

James F. Young

INVENTOR

Leslie D. Thomas

BY Ernest P. Klipfel

ATTORNEY

United States Patent Office 3,386,052

Patented May 28, 1968

3,386,052
WIDE BAND DISTRIBUTED PHASE MODULATOR

Leslie D. Thomas, Baltimore, Md., assignor to Westinghouse Electric Corporation, East Pittsburgh, Pa., a corporation of Pennsylvania Filed Nov. 5, 1964, Ser. No. 409,242
4 Claims. (Cl. 332—18)

ABSTRACT OF THE DISCLOSURE

A carrier signal propagating through a cascaded plurality of phase modulator stages is phase modulated by a modulating signal applied at each phase modulator stage at a time equal to the propagation time the carrier signal takes to reach that particular stage. The modulating signal is delayed for a time equivalent to the time it takes for the carrier signal to arrive at a particular stage in order to avoid the ill effects of the modulations produced by each stage being incoherent. Such incoherence can otherwise occur when the delay time in the carrier line is not negligible compared with the period of the modulation as the modulating signal passes the line.

Figure 1:
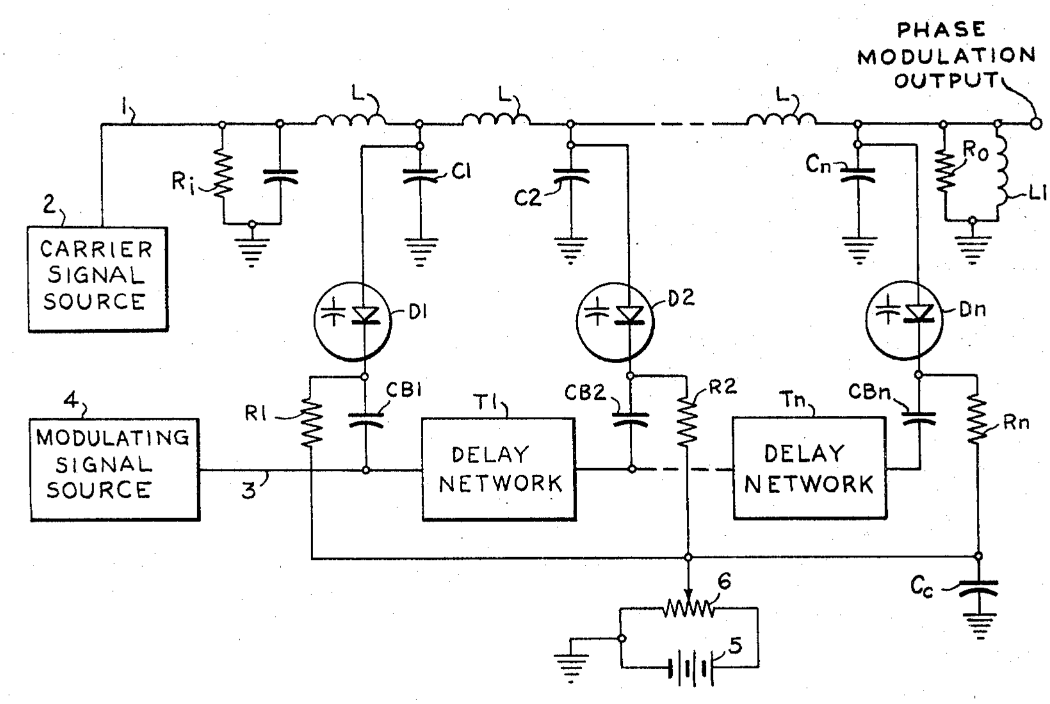

The present invention relates generally to phase modulation systems and more particularly to a cascaded plurality of phase modulators providing wide phase deviation without excessive distortion.

Phase modulation of a carrier frequency signal for use, for example, in communication systems, always presents a problem of obtaining adequate phase deviation. In general, no more than about 0.2 radian peak phase deviation can be obtained at the modulator without excessive distortion. Usually the low deviation of the modulator system is compensated by a following large multiplication circuit to obtain an adequate deviation.

An accepted solution, when the modulation is audio and the carrier signal is radio-frequency, is to cascade a plurality of phase modulators or filter sections all operating at the same frequency and with the same modulation applied. In particular, a phase modulation system can be made of an artificial delay line containing several LC low pass sections wherein each inductance and/or capacitance is varied by the modulating signal. One such system is as shown and described in U.S. Patent No. 2,077,223, issued Apr. 13, 1937, entitled "Modulation System," M. G. Crosby, inventor. In its original form the Crosby phase modulation system applied the modulating signal to each section of a cascaded plurality of filter sections to change the velocity of the carrier wave transmitted over the cascaded sections by changing the electrical characteristics of each section. Acceptable performance was attained so long as the delay time, $nT$, in the line is much smaller than the period of frequency modulation, where $n$ is the number of sections cascaded and T is the time for the carrier signal to propagate through a section. The criteria for in-phase addition of the modulation produced in each section and for linear phase modulation was readily realized when the carrier frequency $f_0$ was in the order of one megacycle per second or greater and the modulation was audio with a frequency $f_m$ in the order of 3 to 10 kilocycles per second.

Prior art phase modulation systems are not readily able to meet the aforementioned criteria for successful operation when the modulating signal is at higher frequencies. For example, consider a 600 channel frequency division multiplex system where the frequency of modulation $f_m$ may be in the order of 2.5 megacycles per second. Obviously, the carrier frequency $f_0$ can be made much larger than the modulating frequency. However, for a reasonable number of cascaded sections the carrier frequency $f_0$ would have to be several hundreds of megacycles. The practical difficulties of the very high frequencies involved after multiplication and the consequent relatively large residual phase modulation noise would make such a system unacceptable.

An object of the present invention is to provide a system for obtaining a wider deviation phase modulation than heretofore available.

Another object of the present invention is to provide a phase modulation system wherein a greater number of sections can be cascaded while maintaining a linear output.

Another object of the present invention is to provide a phase modulation system wherein the carrier is to modulate a large number of degrees and the highest modulating frequency is a large fraction of the frequency of the carrier.

Briefly, the foregoing objects and other advantages are obtained by placing a delaying network between each section of the line connecting the modulating signal to the cascaded sections; each network providing a delay equal to that of the carrier frequency signal as it propagates through the cascaded sections. By making the time for the modulating signal to travel from section to section equal to the time for the carrier frequency signal to travel between the cascaded sections the phase modulation of the carrier at each section will be in phase.

Figure 2:
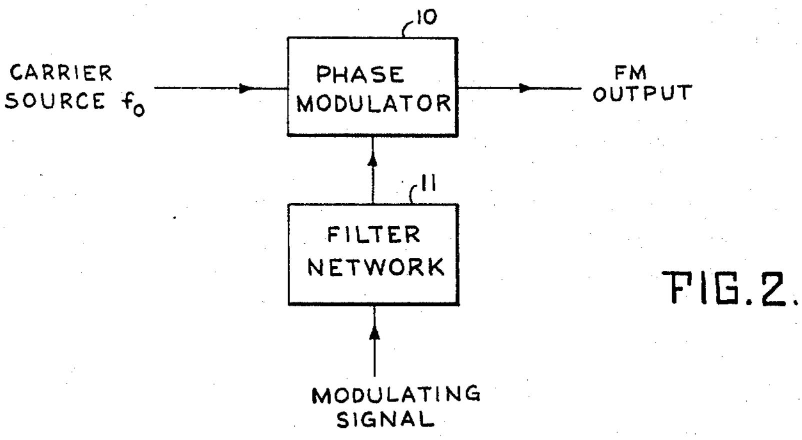

Further objects and advantages of the present invention will be readily apparent from the following detailed description taken in conjunction with the drawing, in which:

FIGURE 1 is an electrical schematic diagram of an illustrative embodiment of the present invention; and FIG. 2 is a block diagram of another application for the illustrative embodiment of the present invention.

The phase modulation system shown in FIG. 1 comprises a cascaded plurality of phase modulator sections each of the LC low pass type. A carrier transmission line 1 provides the necessary inductance L. Capacitors, C1, C2, . . . C$n$ are located along the line at every unit length of inductance L. A resistor $R_i$ connects the carrier frequency source 2 at one end of the line. A coupling resistor $R_0$ connects the carrier output to an external load, not illustrated. Resistors $R_i$ and $R_0$ are equal to the characteristic impedance of the line. It is well known that a phase modulator in such a configuration can be obtained by varying either the inductance L and/or the capacitance C of each of the cascaded sections in response to a modulating signal. For purpose of illustration variable capacitance diodes D1, D2, . . . D$n$ are connected in parallel circuit combination with the capacitance C1, C2 . . . C$n$ of the cascaded sections to vary the magnitude of the capacitance in each section in accordance with a modulating signal. The variable capacitance diode is a semiconductor diode manufactured to accentuate the voltage dependence of the junction capacitance present in all semiconductor diodes. The inherent capacitance will vary in accordance with the direct current voltage across the diode which changes the thickness of its junction depletion layer. The variable capacitance diodes D1, D2 and D$n$ are merely chosen for the purpose of illustrating the variation of capacitance C in each section of the artificial line. It is to be understood that any arrangement whereby the capacitance C or inductance L (or both C and L) of each of the cascaded sections is varied in magnitude or characteristics may be utilized.

A modulating line 3 connects a modulating signal source 4 to each of the sections of the carrier line 3 through blocking capacitors CB1, CB2, . . . CB$n$. The modulating line is at ground potential as far as the carrier frequency $f_0$ is concerned. A source of direct voltage 5 and variable resistor 6 provide biasing on each of the variable capacitor diodes through connecting resistors R1, R2, . . . R$n$. The variable capacitance diodes change in characteristics in response to the modulating signal source 4. A coupling capacitor $C_c$ blocks the voltage source 5 from ground. An RF choke L1 grounds the artificial line to the modulation and to the direct current to prevent undesired interaction between varactor diodes.

If the change in capacitance per section is $\gamma C$ where $\gamma C$ is a function of the modulating voltage then the change in time delay for the propagation of the carrier signal is $\gamma T=\sqrt{L}(\sqrt{C+\gamma C}-\sqrt{C})$ or the differential phase shift $\gamma\phi$ in each section will be equal to $$2\pi f_0\sqrt{L}(\sqrt{C+\gamma C}-\sqrt{C})$$

which in turn is equal to $$K\left(\frac{\sqrt{C+\gamma C}}{\sqrt{C}}-1\right)$$

which is equal to $$K\left(\sqrt{1+\frac{\gamma C}{C}}-1\right)$$

where K at an RF carrier frequency is equal to $2\pi f_0$T. Then the differential phase shift in each section $\gamma\phi$ is equal to $$K\left(\frac{1}{2}\frac{\gamma C}{C}-\frac{1}{8}\left(\frac{\gamma C}{C}\right)^2+\frac{1}{16}\left(\frac{\gamma C}{C}\right)^3\cdots\right).\ \left(\text{Where } \frac{\gamma C}{C}<1\right)$$

If $$\frac{\gamma C}{C}=X$$

sin $\omega t$ with $\omega$ being the angular frequency of the modulating frequency then $$\gamma\phi=K\left(\frac{1}{2}X\sin\omega t-\frac{X^2}{16}(1-\cos 2\omega t)\ .\ .\ .\right)$$

from which the harmonic distortion of the signal can be calculated. It can be shown that the distortion will be small so long as $\gamma\phi$ (and therefore X) in each section is small. The variance in capacitance, $\gamma C$, will be a linear function of the modulating voltage for small changes in the capacitance C when the varactor D1, D2, D$n$ are chosen to have a linear capacity-voltage characteristic over the range of modulating voltages.

At higher modulating frequencies such a phase modulation system where all the capacitances are changed by the modulation voltage in the same phase becomes unusable because the delay in the line or filter network becomes comparable with the period of the modulation. For example if the modulation frequency were 2.5 megacycles/second a time delay of 0.2 microsecond in the line 1 would represent a phase shift of 180° in the modulation. Therefore, in accordance with the present invention a delay network T1 . . . T$n$ is inserted in the modulation line 3 to delay the application of the modulating signal to each section for a time equal to the propagation time of the carrier frequency signal traveling across the artificial delay line 1. In such a manner the time taken for the carrier signal to travel between sections will be equal to the time taken for the modulating signal to travel to each of the variable capacitance diodes located in the sections, and the phase modulation produced at each section will be in phase.

The delay circuit T may be of any suitable wide band delay type such as a coaxial cable. In the practical case if the carrier frequency $f_0$ equals 20 megacycles per second and the inductance L of each section equals 10 microhenries with the capacitance C per section equal to 40 micro-microfarads, the delay per section will be about $2\times10^{-2}$ microseconds. The length of coaxial cable to provide such a delay T between sections need only be about 140 inches assuming a 0.6C propagation velocity in cable, where C is the speed of light. Extra delay in the delay circuit T would, of course, be needed where amplifiers are inserted in the RF line.

With such an arrangement as many as 10 sections can be cascaded, each section producing a differential phase shift $\gamma\phi$=0.05 radian. The overall phase shift will then be 0.5 radian peak, or from 2½ to 5 times what is normally available from a conventional phase modulator before multiplication. Reflections due to improper terminations and changes of line impedance with modulation are minimized by the small degree of modulation in each section. Distortion due to non-linearity in the variable capacitance diodes is likewise minimized. The use of a wide band delay device for the time delays T will avoid standing waves which could occur if they are mismatched and at the same time provide delay over the whole bandwidth of the modulating signal. Accordingly, it can be seen that the use of delay sections in the modulation line with each section providing a delay in the application of the modulation signal equal to the delay in the carrier frequency signal propagation through the section will permit the construction of a wider deviation modulator.

RF by-pass capacitors (not shown) can be connected between the cathode of each variable capacitance diode D1, D2, D$n$ and ground. In a conventional delay of either the lumped circuit or distributed type there would normally be sufficient capacity to ground to by-pass the carrier.

FIG. 2 illustrates how a phase modulator 10 in accordance with the present invention may be utilized to provide a frequency modulator. A filter network 11 is inserted ahead of the phase modulator 10. If the network 11 has an output which is inversely proportional to the modulating frequency then it will combine with the characteristic curve of the phase modulator to provide a constant frequency deviation FM for any modulating frequency.

While the present invention has been described with a degree of particularity for the purposes of illustration, it is to be understood that all alterations, modifications and substitutions within the spirit and scope of the present invention are herein meant to be included. For example, while variable capacitance diodes have been illustrated for the purpose of varying the characteristics of the capacitance of each of the cascaded sections, it is to be understood that any arrangement for varying the capacitance or inductance (or both) of each section in accordance with a modulating signal may be utilized. While the present invention is particularly applicable to a delay line phase modulator, it is equally applicable for cascading other types of phase modulator devices. A carrier frequency of 20 megacycles has been shown. It is to be understood, however, that higher frequencies including the microwave and light regions may be equally well modulated in accordance with the broad concepts of the present invention.

I claim as my invention:

1. A phase modulator comprising, in combination; a cascaded plurality of filter sections along which a carrier frequency signal is propagated; means responsive to a modulating signal for controlling the characteristics of each said filter section; and means for delaying the application of said last-mentioned means to each section by a time substantially equivalent to the delay in propagation of the carrier frequency signal in reaching any particular section.

2. A delay line phase modulator comprising, in combination; a cascaded plurality of filter sections; means for applying a carrier frequency signal to one end of said cascaded plurality of filter sections; means for controlling the characteristics of said cascaded plurality of filter sections in accordance with a modulating signal; and means for delaying the application of said last-mentioned means to each section by a time substantially equivalent to the delay in propogation of the carrier frequency signal through the sections located prior to said each section.

3. In combination; a cascaded plurality of phase modulators for the propagation of a carrier frequency signal thereacross; means for changing the characteristics of each said phase modulator in accordance with a modulating signal; and means for delaying the modulating signal applied to each phase modulator until the carrier signal arrives at each phase modulator.

4. A phase modulator comprising, in combination; an artificial delay line including a plurality of LC low pass sections, each section including reactance members which when varied in magnitude shift the phase of a carrier signal propagating therethrough; means responsive to a modulating signal for varying the magnitude of said reactance members; and delay means for making the time for the modulating signal to travel from section to section substantially equal to the time taken for the carrier signal to travel from section to section.

References Cited

UNITED STATES PATENTS

| | | | |
|---|---|---|---|
| 2,522,368 | 9/1950 | Guanella | 332—2 X |
| 2,545,871 | 3/1951 | Bell | 333—29 X |
| 2,626,357 | 1/1953 | McClellan. | |
| 2,890,417 | 6/1959 | Sanders | 332—29 X |
| 3,012,203 | 12/1961 | Tien. | |
| 3,267,393 | 8/1966 | Brossard | 332—30 |
| 2,852,750 | 9/1958 | Goldberg | 333—29 X |

ALFRED L. BRODY, *Primary Examiner.*